US011922896B1

(12) United States Patent
Li et al.

(10) Patent No.: US 11,922,896 B1
(45) Date of Patent: Mar. 5, 2024

(54) ARRAY SUBSTRATE AND DISPLAY PANEL

(71) Applicant: HKC CORPORATION LIMITED, Guangdong (CN)

(72) Inventors: Zhiwei Li, Guangdong (CN); Rongrong Li, Guangdong (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/334,950

(22) Filed: Jun. 14, 2023

(30) Foreign Application Priority Data

Nov. 9, 2022 (CN) ......................... 202211397120.0

(51) Int. Cl.
*G09G 3/36* (2006.01)

(52) U.S. Cl.
CPC ......... *G09G 3/3677* (2013.01); *G09G 3/3688* (2013.01); *G09G 3/3696* (2013.01); *G09G 2310/0278* (2013.01); *G09G 2320/0209* (2013.01); *G09G 2320/0247* (2013.01)

(58) Field of Classification Search
CPC .................................................... G09G 3/3677
See application file for complete search history.

(56) References Cited

U.S. PATENT DOCUMENTS

| | | | |
|---|---|---|---|
| 2008/0024416 A1 | 1/2008 | Onogi et al. |
| 2010/0039598 A1 | 2/2010 | Chang |
| 2011/0316809 A1 | 12/2011 | Kim et al. |

FOREIGN PATENT DOCUMENTS

| | | | |
|---|---|---|---|
| CN | 102156365 A | 8/2011 |
| CN | 102237355 A | 11/2011 |
| CN | 103488019 A | 1/2014 |
| CN | 103926757 A | 7/2014 |
| CN | 107123666 A | 9/2017 |
| CN | 112835217 A | 5/2021 |

OTHER PUBLICATIONS

The first office action issued in corresponding CN application No. 202211397120.0 dated Dec. 15, 2022.
WIPO, International Search Report and Written Opinion for International Application No. PCT/CN2023/094765, dated Aug. 4, 2023.

*Primary Examiner* — Gustavo Polo
(74) *Attorney, Agent, or Firm* — HAUPTMAN HAM, LLP

(57) ABSTRACT

An array substrate is provided. The array substrate includes a first surface and a second surface opposite to the first surface. The array substrate further includes multiple first common lines and multiple second common lines. The multiple first common lines extend along a first direction and are arranged on the first surface at intervals of a first distance along a second direction, the multiple second common lines extend along the second direction and are arranged on the second surface at intervals of a second distance along the first direction. The first common line and the second common line are electrically connected to each other through the array substrate, and the first common line and the second common line are configured to transmit a common voltage to the pixel unit, the pixel unit is driven to display an image by the common voltage and the data signal.

12 Claims, 5 Drawing Sheets

ARRAY SUBSTRATE AND DISPLAY PANEL

CROSS REFERENCE TO RELATED APPLICATION(S)

This application claims priority to and the benefit of Chinese Application No. 202211397120.0, filed Nov. 9, 2022, the entire disclosure of which is hereby incorporated by reference.

TECHNICAL FIELD

This disclosure relates to the field of display technology, and particularly to an array substrate and a display panel.

BACKGROUND

Liquid crystal display (LCD) panels have been widely used in electronic devices such as computers, mobile phones, and televisions. In an LCD, a pixel unit is driven to display an image mainly by a voltage difference between a data voltage corresponding to a data signal transmitted by a data line and a common voltage. When the common voltage is transmitted to different pixel units through different common lines, capacitive coupling is prone to occur between adjacent data lines and common lines, which causes the common voltage to deviate from a preset voltage, and further causes crosstalk or flicker in the display of the pixel units.

Therefore, how to maintain the stable output of the common voltage is a problem to be solved.

SUMMARY

An array substrate is provided in embodiments of the disclosure. The array substrate includes a first surface and a second surface opposite to the first surface, where the first surface is provided with multiple scan lines extending along a first direction, multiple data lines extending along a second direction, and multiple pixel units arranged in an array, the first direction is different from the second direction, and the pixel unit is configured to receive a scan signal from the scan line and receive a data signal from the data line, and configured to display an image according to the data signal under control of the scan signal. The array substrate further includes multiple first common lines and multiple second common lines, where the multiple first common lines extend along the first direction and are arranged on the first surface at intervals of a first distance along the second direction, the multiple second common lines extend along the second direction and are arranged on the second surface at intervals of a second distance along the first direction, the first common line and the second common line are electrically connected to each other through the array substrate, and the first common line and the second common line are configured to transmit a common voltage to the pixel unit to drive, together with the data signal, the pixel unit to display an image.

A display panel is also provided in embodiments of the disclosure. The display panel includes a data driving circuit, a common voltage generating circuit, and the foregoing array substrate. The common voltage generating circuit is configured to output the common voltage to the pixel unit in the array substrate, the data driving circuit is configured to output the data signal to the pixel unit, and a scan driving circuit disposed on the array substrate is configured to output the scan signal to the pixel unit, the pixel unit is configured to receive the data signal under the control of the scan signal, and the pixel unit is driven by a data voltage corresponding to the data signal and the common voltage to display an image.

Embodiments of the disclosure further provide a display terminal including the described display panel and array substrate.

BRIEF DESCRIPTION OF THE DRAWINGS

To describe technical solutions in embodiments of the disclosure more clearly, the following briefly introduces the accompanying drawings required for describing the embodiments. Apparently, the accompanying drawings in the following description show merely some embodiments of the disclosure, and a person of ordinary skill in the art may still derive other drawings from these accompanying drawings without creative efforts.

Figure 1:
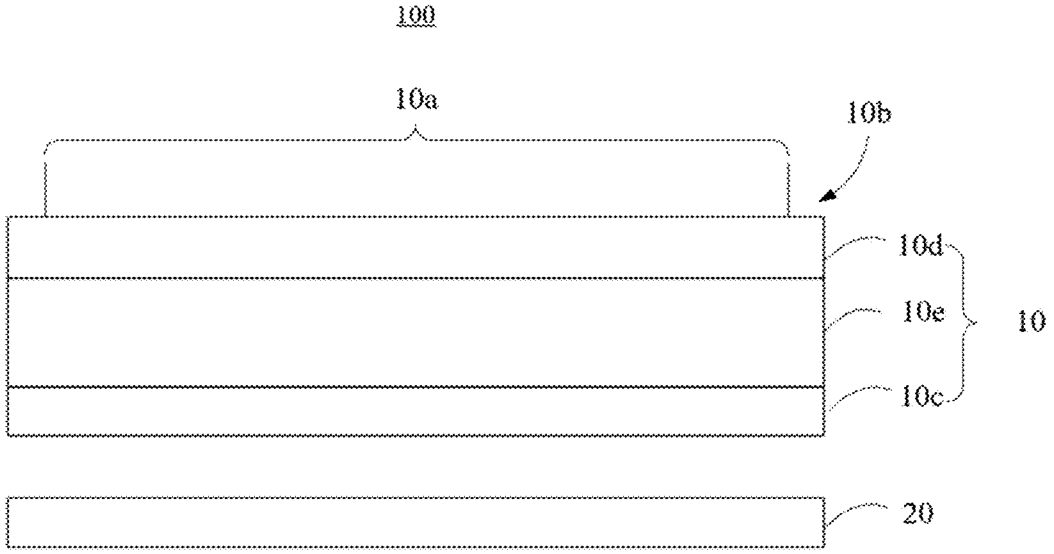
FIG. 1 is a schematic side structural view of a display terminal according to a first embodiment of the disclosure.

DESCRIPTION OF REFERENCE NUMERALS a display terminal—100, a display panel—10, a backlight module—20, a display region—10*a*, a non-display region—10*b*, an array substrate—10*c*, a color film substrate—10*d*, a liquid crystal layer—10*e*, a pixel unit—P, a timing control circuit—11, a common voltage generating circuit—12, a data driving circuit—13, a scan driving circuit—14, a first direction—F1, a second direction—F2, n common lines—C1~Cn, n scan lines—G1~Gn, m data lines—S1~Sm, an i-th scan line—Gi, an i-th data line—Si, an i-th common line—Ci, a switch transistor—T, a storage capacitor—Cst, a liquid crystal capacitor—Clc, a common voltage generating unit—121, a first surface—10*c*, a second surface—10*c*2, a first common line—CM1, a second common line—CM2, a conductive portion—E, a through hole—H, a feedback line—CL

DETAILED DESCRIPTION

In order to facilitate understanding of the disclosure, the disclosure will be described more fully hereinafter with reference to the accompanying drawings. Preferred embodiments of the present disclosure are shown in the drawings, but the present disclosure may be implemented in many different forms and is not limited to the embodiments described herein. Rather, these embodiments are provided so that this disclosure will be thorough and complete.

The following description of the embodiments refers to the accompanying drawings to illustrate specific embodiments of the disclosure. Sequential references herein to components themselves, such as "first", "second", etc., are used merely to distinguish between described objects and do not have any ordinal or technical meaning. The expressions "connected" and "coupled" in the disclosure, unless otherwise specified, both include direct connection and indirect connection. Directional terms mentioned in the disclosure, For example, "upper", "lower", "front", "rear", "left", "right", "inner", "outer", "side" and the like are only directions with reference to the accompanying drawings, and therefore, the directional terms are used for better and clearer illustration and understanding of the disclosure, rather than indicate or imply that the indicated device or element must have a particular orientation, be constructed and operated in a particular orientation, Therefore, it cannot be understood that the present disclosure is limited thereto.

In the description of the disclosure, it should be noted that, unless specified or limited otherwise, the terms "mounted", "connected to", and "connected with" should be understood broadly, for example, may be fixedly connected, may also be detachably connected, or may be integrally connected; may also be mechanical connections; may also be direct connections or indirect connections via intervening structures; and may also be inner communications of two elements. The specific meanings of the above terms in the disclosure can be understood by those skilled in the art according to specific situations. It should be noted that terms such as "first" and "second" in the description and claims and drawings of the disclosure are used for distinguishing different objects, rather than for describing a specific sequence.

In addition, as used herein, the term "include", "may include", "comprise", or "may comprise" indicates the existence of a corresponding function, operation, element, etc., disclosed, and does not limit one or more other functions, operations, elements, etc. In addition, the terms "comprise" or "include" means that there are corresponding features, numbers, steps, operations, elements, components, or a combination thereof disclosed in the specification, and do not exclude the presence or addition of one or more other features, numbers, steps, operations, elements, components, or a combination thereof, and are intended to cover a non-exclusive inclusion. In addition, when describing embodiments of the disclosure, "can" is used to mean "one or more embodiments of the disclosure". Also, the term "exemplary" is intended to mean exemplary or illustrative.

Unless defined otherwise, all technical and scientific terms used herein have the same meaning as commonly understood by one of ordinary skill in the art to which this application belongs. The terminology used herein in the description of the disclosure is for the purpose of describing particular embodiments only and is not intended to be limiting of the disclosure.

In view of the described technical problem in the background, the disclosure provides an array substrate and a display panel for effectively maintaining a stable output of a common voltage.

Please refer to FIG. 1, FIG. 1 is a schematic structural side view of a display terminal according to a first embodiment of the disclosure. As shown in FIG. 1, the display terminal 100 includes a display panel 10 and a backlight module 20 (BM), where the backlight module 20 is configured to provide lights for the display panel 10 for displaying.

In an exemplary embodiment, the display terminal 100 further includes a power supply module and a signal processing module, etc., and the power supply module is configured to provide a driving power supply for the display terminal 100 to display an image(s).

The display panel 10 includes a display region 10*a* for images and a non-display region 10*b*. The display region 10*a* is used for image display, and the non-display region 10*b* is arranged around the display region 10*a* for arrangement of other auxiliary components or modules. Specifically, the display panel 10 includes an array substrate (AS) 10*c*, a color film substrate (CF) 10*d*, and a liquid crystal layer 10 *e* interposed between the array substrate 10*c* and the color film substrate 10*d*. Driving elements are disposed on the array substrate 10*c* and the color film substrate 10*d* to generate corresponding electric fields according to a data signal Data, so as to drive the liquid crystal molecules in the liquid crystal layer 10*e* to rotate at an angle to emit light with corresponding brightness, so as to display images.

Figure 2:
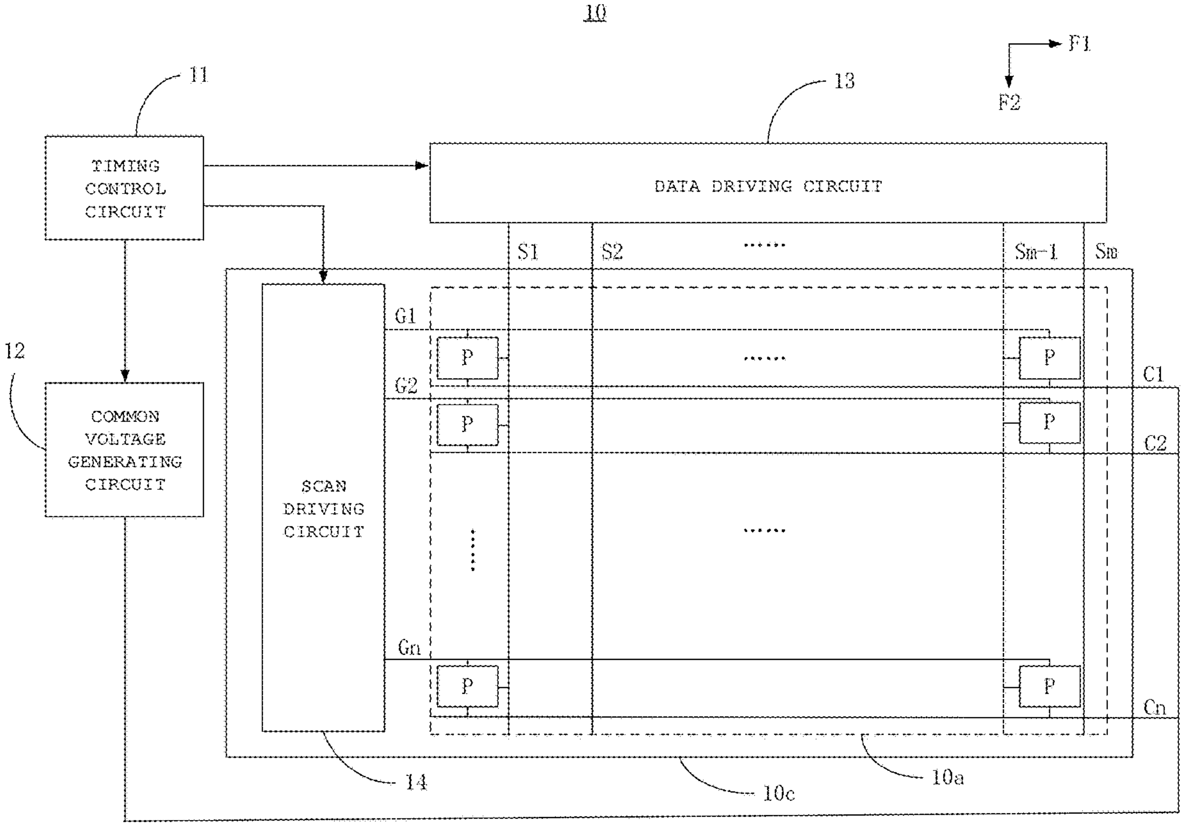
FIG. 2 is a schematic plan layout view of a display panel in FIG. 1.

Please refer to FIG. 2, FIG. 2 is a schematic plan layout view of the display panel 10 in FIG. 1. As shown in FIG. 2, the corresponding image display region 10*a* in the array substrate 10*c* includes multiple m*n pixel units P arranged in a matrix, m data lines S1~Sm, n scan lines G1~Gn, where m and n are natural numbers greater than 1.

The m data lines S1~Sm are arranged in parallel along a first direction F1 and extend along a second direction F2, the n scan lines G1-Gn are arranged in parallel along the second direction F2 and extend along the first direction F1, the n scan lines G1-Gn and the m data lines S1~Sm are insulated from each other, and the first direction F1 and the second direction F2 are perpendicular to each other.

Corresponding to the non-display region 10*b* of the display panel 10 (FIG. 1), disposed are a timing control circuit 11 for driving the pixel units P to display images, a common voltage generating circuit 12, a data driving circuit 13, and a scan driving circuit 14.

The timing control circuit 11 is electrically connected to the common voltage generating circuit 12, the data driving circuit, and the scan driving circuit 14, and is configured to generate and output a time sequence control signal to the common voltage generating circuit 12, the data driving circuit 13, and the scan driving circuit 14. A common voltage timing signal in the timing control signal is outputted to the common voltage generating circuit 12, a data timing signal in the timing control signal is outputted to the data driving circuit 13, and a scan timing signal in the timing control signal is outputted to the scan driving circuit 14.

The common voltage generating circuit 12 is configured to generate a common voltage Vcom according to the received common voltage timing signal, and transmit the common voltage Vcom to a common electrode(s) (not shown) corresponding to the pixel units P through the n common lines C1-Cn, so as to provide the common voltage Vcom to corresponding pixel units P. The n common lines C1-Cn are sequentially arranged along the second direction F2.

The data driving circuit 13 is configured to output a data signal to the pixel unit P according to the received data timing control signal, where the data signal and the common voltage Vcom have a voltage difference to drive the pixel unit P to display an image(s).

The scan driving circuit 14 is electrically connected to the n scan lines G1-Gn, and is configured to output a scan signal Gn through the n scan lines G1-Gn according to the received scan timing signal, so as to control when the pixel unit P receives the data signal. The scan driving circuit 14 is configured to output the scan signals through n scan lines G1, G2, . . . , Gn sequentially according to a scan period and in an arrangement order of the n scan lines G1-Gn.

In this embodiment, the circuit elements in the scan driving circuit 14 and the pixel units P in the display panel 10 are manufactured to the array substrate 10*c* in the same process, for example, the gate driver on array (GOA) technology.

Figure 3:
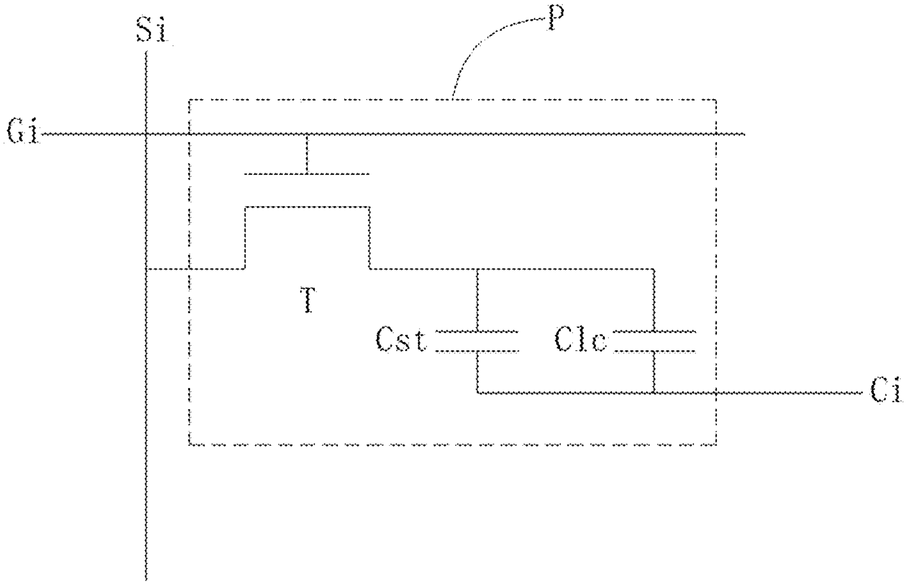
FIG. 3 is a schematic equivalent circuit diagram of a pixel unit in FIG. 2.

Please also refer to FIG. 3, FIG. 3 is an equivalent circuit diagram of the pixel units in FIG. 2.

As shown in FIG. 3, the pixel unit P includes a switch transistor T, a storage capacitor Cst, and a liquid crystal capacitor Clc, where a gate electrode ("gate" for short) of the switch transistor T is electrically connected to an i-th scan line Gi, where $1 \leq i \leq n$, a source electrode ("source" for short) of the switch transistor T is electrically connected to an i-th data line Si, and a drain electrode ("drain" for short) of the switch transistor T is electrically connected to the storage capacitor Cst and the liquid crystal capacitor Clc. The storage capacitor Cst is electrically connected between the i-th common line Ci and the drain of the switch transistor T, and the liquid crystal capacitor Clc is electrically connected between the i-th common line Ci and the drain of the switch transistor T. When the i-th scan line G receives and transmits the scan signal outputted from the scan driving circuit 14, the switch transistor T is electrically conducted, the data signal is transmitted to the storage capacitor Cst and the liquid crystal capacitor Clc through the i-th data line S and the switch transistor T, a voltage difference between the data signal and the common voltage Vcom transmitted by the i-th common line Ci can charge the storage capacitor Cst and the liquid crystal capacitor Clc, and drive the liquid crystal to emit light of a gray scale corresponding to the data signal so as to display an image.

Figure 4:
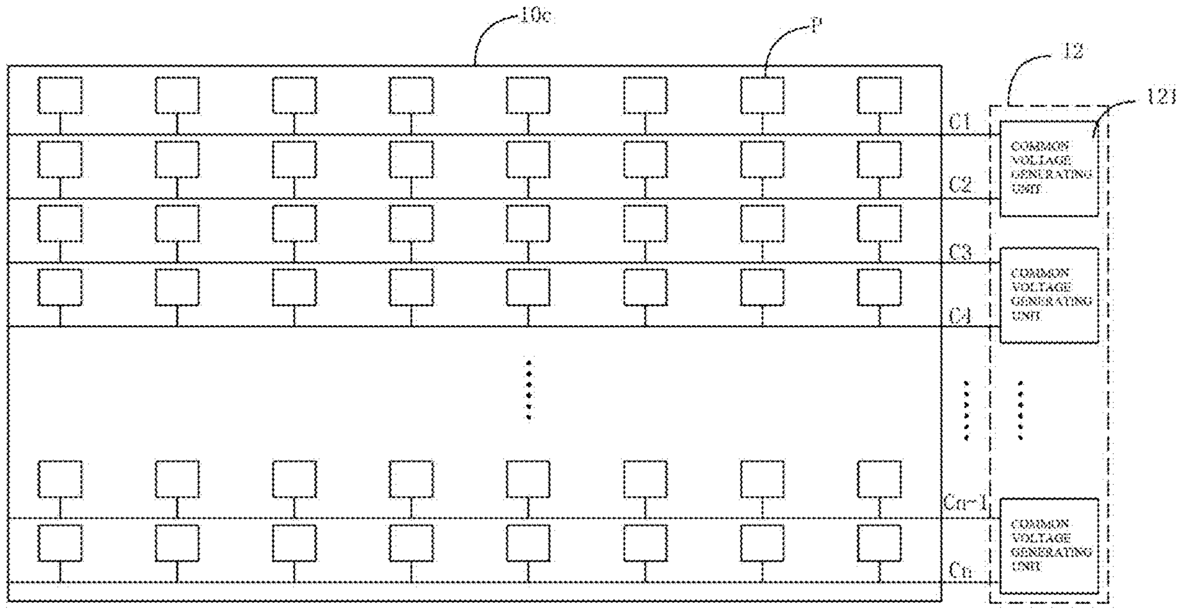
FIG. 4 is a schematic layout view of a common voltage generating circuit and common lines in FIG. 2.

Please refer to FIG. 4, FIG. 4 is a schematic layout view of the common voltage generating circuit and common lines in FIG. 2.

As shown in FIG. 4, the common voltage generating circuit 12 includes multiple common voltage generating units 121, and the n common lines C1-Cn are arranged along the second direction F2 for receiving the common voltage Vcom from the multiple common voltage generating units 121 and transmitting the common voltage Vcom to correspondingly pixel units P connected.

Each of the common voltage generating units 121 is connected to at least one common line C for controlling the common voltage Vcom outputted to one or more rows of pixel units P.

For example, one common voltage generating unit 121 is connected with two common lines C, to correspondingly control the common voltage Vcom of two rows of pixel units P through the two common lines C. The first common line C1 and the second common line C2 are connected to the same common voltage generating unit 121, and the common voltage generating unit 121 is configured to control the change in the common voltage Vcom of the first row of pixel units P and the second row of pixel units P through the first common line C1 and the second common line C2.

By independently controlling the common voltage Vcom of one or more rows of pixel units P, the influence of coupling of the data lines and the common lines on the common voltage can be effectively eliminated, thereby eliminating the influence of the fluctuation of the common voltage Vcom on the display of the pixel units, and solving the problem of abnormal flicker of the pixel units.

Figure 5:
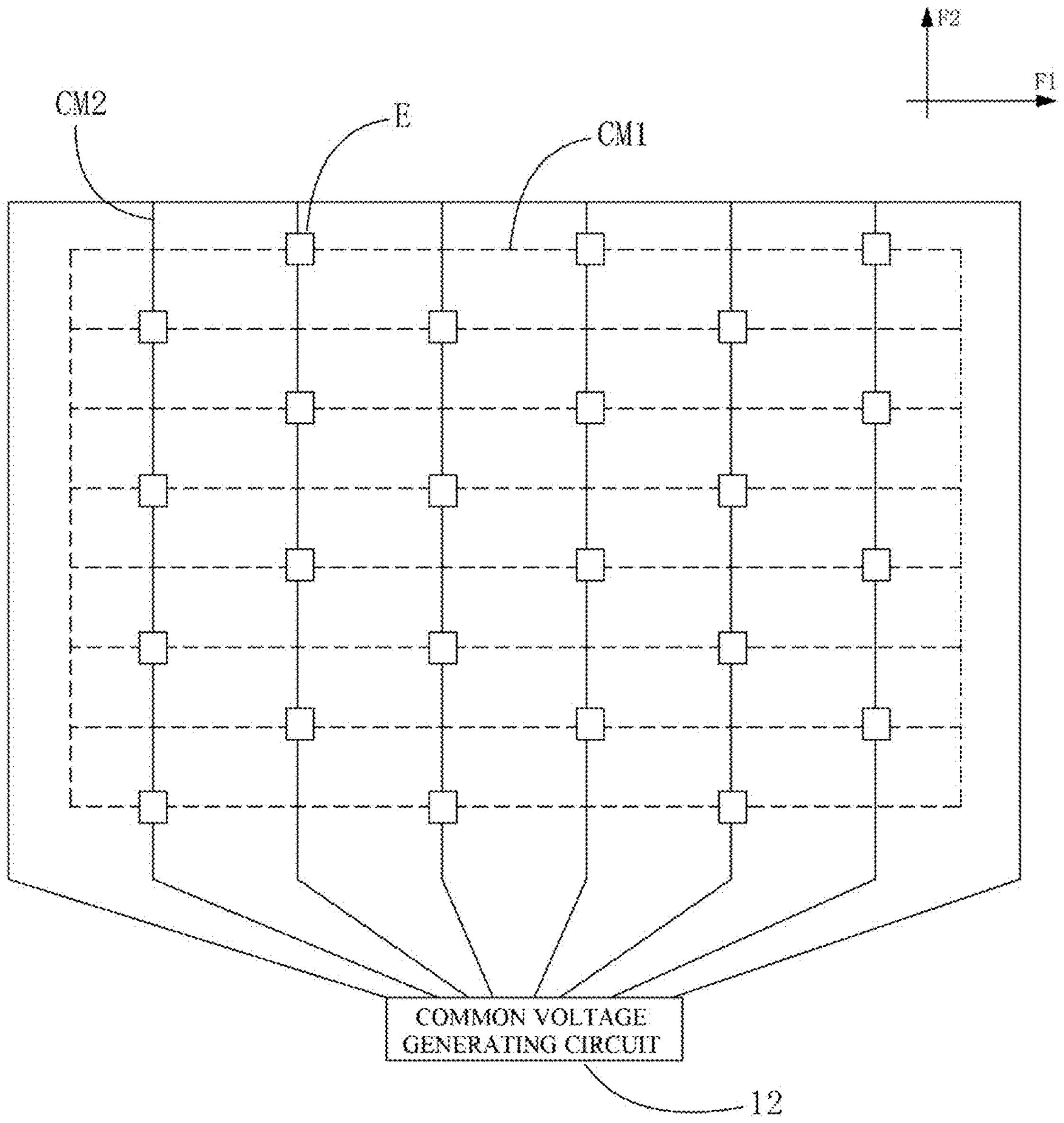
FIG. 5 is a schematic layout view of common lines in an array substrate in FIG. 2 according to a second embodiment of the present disclosure.
Figure 7:
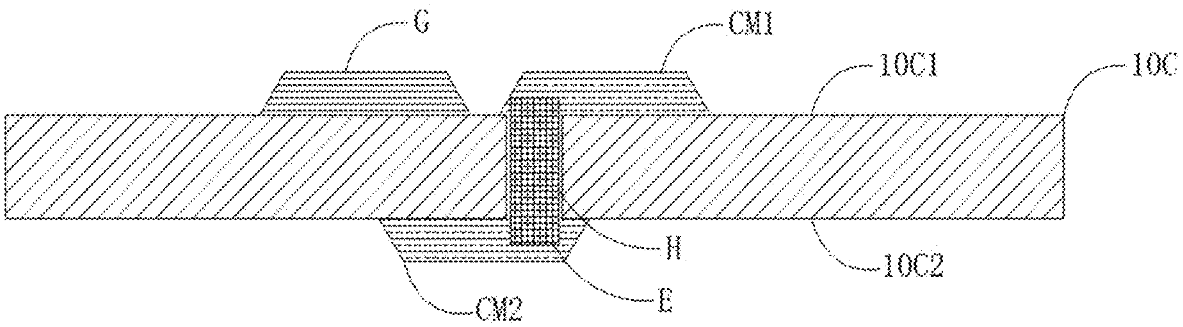
FIG. 7 is a schematic cross-sectional view of an array substrate in FIG. 5.

Please refer to FIG. 5, FIG. 5 is a schematic layout view of the common lines of the array substrate in FIG. 2 according to a second embodiment of the disclosure. As shown in FIG. 5, the array substrate 10*c* includes multiple first common lines CM1 and multiple second common lines CM2. The multiple first common lines CM1 extend along the first direction F1 and are arranged on a first surface 10*c*1 at intervals of a first distance along the second direction F2 (FIG. 7). The multiple second common lines CM2 extend along the second direction F2 and are arranged on a second surface 10*c*2 at intervals of a second distance along the first direction F1 (FIG. 7). The first common line CM1 and the second common line CM2 are electrically connected to each other through the array substrate 10*c*, and the first common line CM1 and the second common line CM2 are configured to transmit the common voltage to the pixel unit P so as to cooperate with the data signal to drive the pixel units P to display an image.

The first common line CM1 may be routed through a through hole H (FIG. 7) provided in the array substrate 10*c*, so that the first common line CM1 is electrically connected to the second common line CM2 in the second surface 10*c*2 through the through hole H and then returns to the first surface 10*c*1 through the through hole H. Similarly, the second common line CM2 may be arranged in the same manner.

The first distance and the second distance may be adjusted according to the number of the first common lines CM1 and the second common lines CM2 and the size of the array substrate 10*c*, which is not limited in the present disclosure.

The array substrate 10*c* further includes multiple conductive portions E penetrating through the array substrate 10*c*, where the conductive portion E is located at a position where the first common line CM1 intersects with the second common line CM2, and each conductive portion E is respectively connected to at least one first common line CM1 and at least one second common line CM2. That is, any one of the conductive portions E penetrates through the first surface 10*c*1 and the second surface 10*c*2 of the array substrate 10*c*, and the multiple first common lines CM1 and the multiple second common lines CM2 are electrically connected through the multiple conductive portions E, respectively.

In multiple conductive portions E disposed in a same row along the first direction F1, any two adjacent conductive portions E are correspondingly connected to two second common lines CM2 which are spaced apart by at least one second common line CM2. In multiple conductive portions E arranged in the same column along the second direction F2, any two adjacent conductive portions E are correspondingly connected to two first common lines CM1 which are spaced apart by at least one first common line CM1.

For conductive portions E in any two adjacent rows, multiple second common lines CM2 correspondingly connected to conductive portions E in the first row and multiple second common lines CM2 correspondingly connected to conductive portions E in the second row are alternately arranged along the first direction. For conductive portions E in any two adjacent columns, multiple first common lines CM1 correspondingly connected to conductive portions E in the first column and multiple first common lines CM1 correspondingly connected to conductive portions E in the second column are alternately arranged along the second direction.

For example, for conductive portions E in any adjacent i-th row and (i+1)-th row, multiple second common lines correspondingly connected to conductive portions E in the i-th row and multiple second common lines correspondingly connected to conductive portions E in the (i+1)-th row are alternately arranged along the first direction f1, where i is a positive integer. For conductive portions E in any adjacent j-th column and (j+1)-th column, multiple first common lines CM1 correspondingly connected to conductive portions E in the j-th column and multiple first common lines CM1 correspondingly connected to conductive portions E in the (j+1)-th column are alternately arranged along the second direction F2, where j is a positive integer.

When i=1, for the first row of conductive portions E and the second row of conductive portions E, multiple second common lines CM2 correspondingly connected to the first row of conductive portions E and multiple second common lines CM2 correspondingly connected to the second row of conductive portions E are alternately arranged in the first direction F1.

When j=1, for the first column of conductive portions E and the second column of conductive portions E, multiple first common lines CM1 correspondingly connected to the first column of conductive portions E and multiple first common lines CM1 correspondingly connected to the second column of conductive portions E are alternately arranged along the second direction F2.

By arranging the conductive sections E in a predetermined array, the number of the conductive sections E can be reduced, and the number of openings for the array substrate 10*c* can be reduced, thereby ensuring the stability of the array substrate 10*c*.

The multiple second common lines CM2 are connected to the common voltage generating circuit 12. The common voltage generating circuit 12 is configured to output the common voltage Vcom through the multiple second common lines CM2, and transmit the common voltage Vcom to the multiple first common lines CM1 through the multiple conductive portions E arranged in an array.

For the multiple second common lines CM2 disposed on the second surface 10*c*2 along the second direction F2, projections thereof on the first surface 10*c*1 coincide with the multiple data lines S. By aligning the second common lines CM2 with the data lines S, the aperture ratio of the pixel unit P can be effectively maintained.

Figure 6:
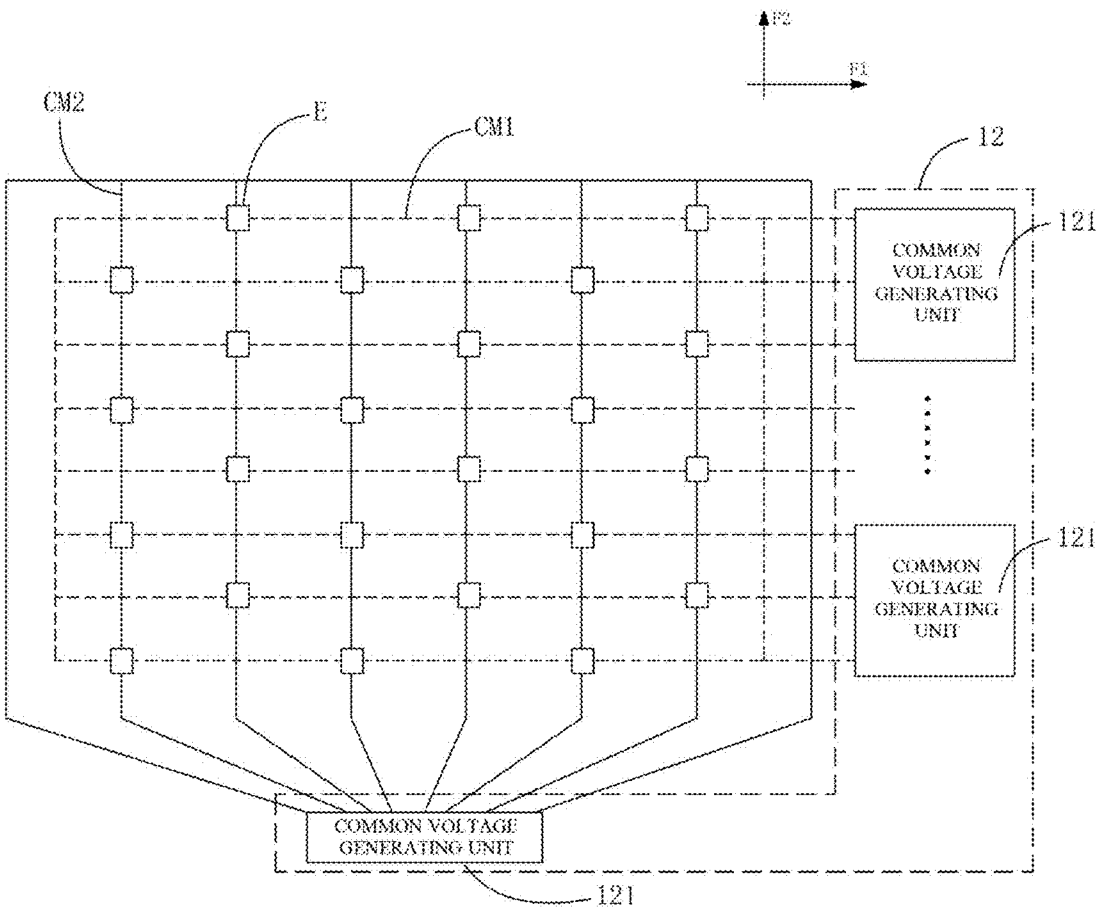
FIG. 6 is a schematic layout view of common lines of an alternative embodiment in FIG. 5.

Please refer to FIG. 6, FIG. 6 is a schematic layout view of the common lines of an alternative embodiment of FIG. 5. As shown in FIG. 6, the common voltage generating circuit 12 includes multiple common voltage generating units 121, where the multiple first common lines CM1 arranged on the first surface 10*c*1 are connected to at least one common voltage generating unit 121, and the multiple second common lines CM2 arranged on the second surface 10*c*2 are connected to at least another different common voltage generating unit 121.

In one embodiment, the common voltage generating circuit 12 includes two common voltage generating units 121, all of the first common lines CM1 are connected to one common voltage generating unit 121, and all of the second common lines CM2 are connected to the other common voltage generating unit 121.

In one embodiment, the common voltage generating circuit 12 includes three common voltage generating units 121. In the multiple first common lines CM1, half of the first common lines CM1 are connected to one common voltage generating unit 121, the other half of the first common lines CM1 are connected to another common voltage generating unit 121, and all of the second common lines CM2 are connected to the third common voltage generating unit 121 which is different from the first two common voltage generating units.

In one embodiment, the common voltage generating circuit 12 includes multiple common voltage generating units 121, every three adjacent first common lines CM1 are connected to one common voltage generating unit 121, and all second common lines CM2 are connected to one common voltage generating unit 121.

By respectively providing corresponding common voltage generating units 121, the common voltage outputted by the first common line CM1 and the second common line CM2 is more stable, thereby reducing the influence of capacitive coupling on the common voltage. Please also refer to FIG. 7, FIG. 7 is a schematic cross-sectional view of the array substrate in FIG. 5. As shown in FIG. 7, the first common line CM1 and the scan line G are disposed on the first surface 10*c*1 of the array substrate 10*c*, the second common line CM2 is disposed on the second surface 10*c*2 of the array substrate 10*c*, the conductive portion E penetrates through the first surface 10*c*1 and the second surface 10*c*2, and the first common line CM1 is electrically connected to the second common line CM2 via the conductive portion E. The multiple second common lines CM2 are configured to transmit the received common voltage Vcom to the multiple first common lines CM1 through the conductive portions E.

Specifically, the through hole H penetrating through the array substrate 10*c* is formed at a preset position of the array substrate 10*c*, and a conductive material is filled in the through hole H to form a conductive portion E, where the conductive material may be silver paste or the like. For the arrangement of the through-holes H, a cyclic dry etching process can be used to etch the array substrate 10*c* by using hydrogen fluoride HF and oxygen O2, where the array substrate 10*c* is a glass (SiO2) substrate, and during etching of the array substrate 10*c*, C4F8 is used as a protective gas so as to protect the side surface of the array substrate 10*c* during etching, thereby avoiding the occurrence of bottom defects when forming the through-holes H. The reaction equation is: 4HF+SiO2=SiF4+2H2O 2. When the array substrate 10*c* is a flexible substrate, the through-hole H can be formed by exposure.

In order to maintain the aperture ratio of the pixel unit P, the arrangement of the through hole H should be maintained within a certain range, and the cross-sectional area of the through hole H is for example 10 μm×10 μm.

The first common lines CM1 are electrically connected to the second common lines CM2 through the conductive portions E arranged in an array. Because the second common lines CM2 are disposed on the back side of the array substrate 10*c*, the capacitive coupling effect between the common line and the common line, between the common line and the scan line, and between the common line and the data line can be effectively eliminated, thereby reducing the influence of the capacitive coupling effect on the common voltage.

The multiple second common lines CM2 extending in the second direction F2 are disposed on the second surface 10*c*2 of the array substrate 10*c*, and the multiple second common lines CM2 are electrically connected to the multiple first common lines CM1 via the multiple conductive portions E, so that the multiple second common lines CM2 can transmit the received common voltage Vcom to the multiple first common lines CM1 through the conductive portions E, as such, the coupling effect of the scan line G and the first common line CM1 on the common voltage is eliminated, thereby preventing the crosstalk due to the change in the common voltage. Meanwhile, the real-time refresh of the common voltage of the panel can be achieved through the multiple second common lines CM2.

Figure 8:
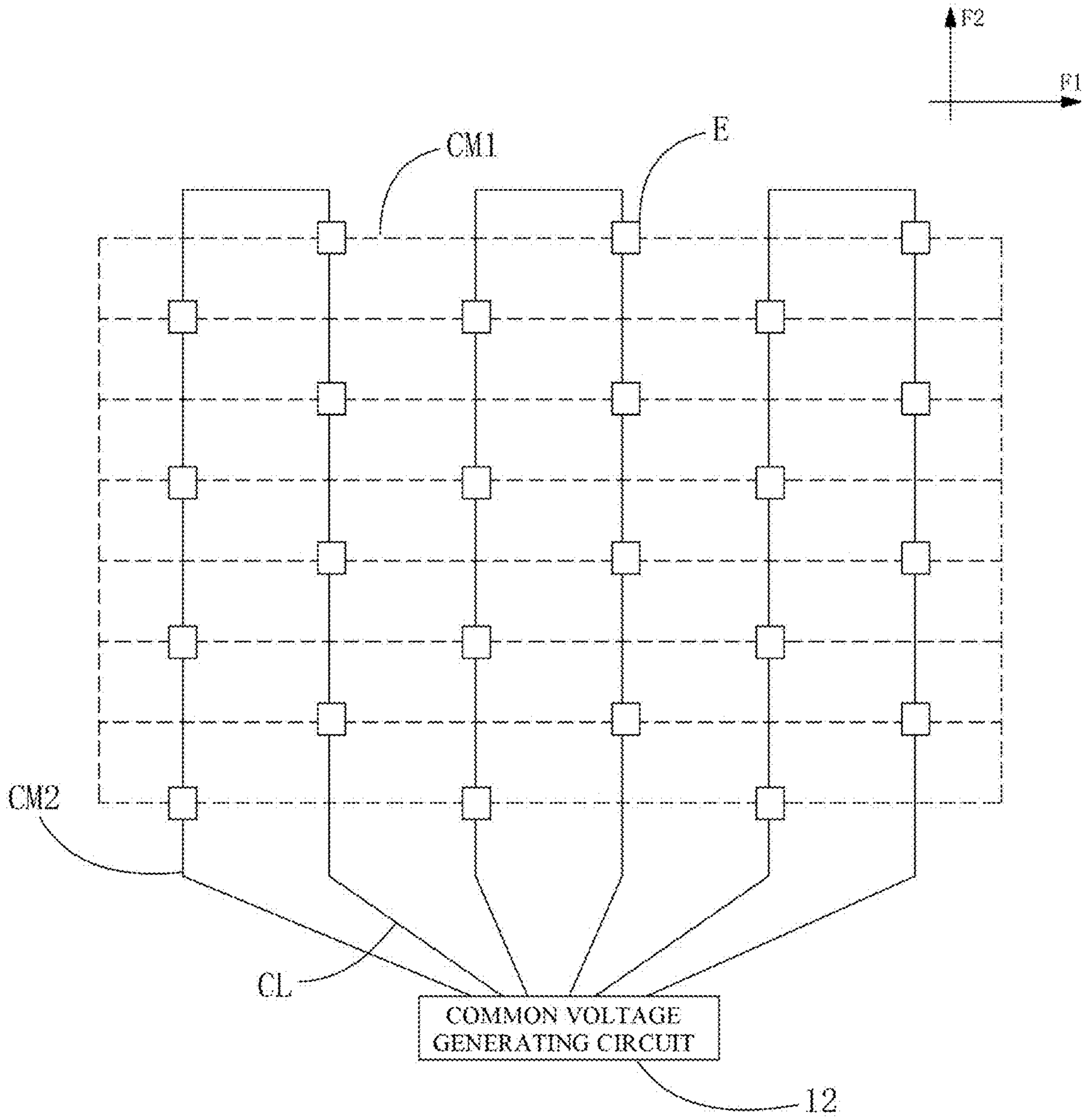
FIG. 8 is a schematic layout view of common lines of the array substrate in FIG. 2 according to a third embodiment of the present disclosure.

Please refer to FIG. 8, FIG. 8 is a schematic layout view of the common lines of the array substrate in FIG. 2 according to a third embodiment of the disclosure. As shown in FIG. 8, the array substrate 10_c_ includes multiple first common lines CM1, multiple second common lines CM2, multiple feedback lines CL, and multiple conductive portions E arranged in an array.

The multiple first common lines CM1 are disposed on the first surface 10_c_1 of the array substrate 10_c_ (FIG. 7), and the pixel units P, the data lines S, and the scan lines G are disposed on the first surface 10_c_1. The multiple second common lines CM2 and the multiple feedback lines CL are disposed on the second surface 10_c_2 of the array substrate 10_c_ (FIG. 7), and the second surface 10_c_2 is opposite to the first surface 10_c_1, i. e., the second surface 10_c_2 is the back side of the first surface 10_c_1. All conductive portions E penetrate through the first surface 10_c_1 and the second surface 10_c_2 of the array substrate 10_c_, and the multiple first common lines CM1 and the multiple second common lines CM2 are electrically connected via the multiple conductive portions E, respectively.

Each feedback line CL is correspondingly connected to one second common line CM2 and is arranged parallel to the second common line CM2. For two adjacent columns of conductive portions E arranged along the second direction F2, the second common line CM2 is electrically connected to the first column of conductive portions E, the feedback line CL is electrically connected to the second column of conductive portions E, and the second common line CM2 and the corresponding feedback line CL are electrically connected to the common voltage generating circuit 12 to form a common voltage detection circuit. The common voltage generating circuit 12 is configured to output the common voltage Vcom through the second common line CM2, receive a feedback signal from the feedback line CL, and adjust the common voltage Vcom outputted to the second common line CM2 according to the feedback signal.

For the multiple second common lines CM2 and the multiple feedback lines CL disposed on the second surface 10_c_2 along the second direction F2, projections thereof respectively coincide with the multiple data lines S. By aligning the second common lines CM2, the feedback lines CL, and the data lines S in the cross-section direction, the aperture ratio of the pixel unit P can be effectively maintained.

In an exemplary embodiment, the common voltage generating circuit 12 includes multiple common voltage generating units 121, where the multiple first common lines CM1 disposed on the first surface 10_c_1 are connected to at least one common voltage generating unit 121, and the multiple second common lines CM2 and multiple feedback lines CL disposed on the second surface 10_c_2 are connected to at least one common voltage generating unit 121. By setting corresponding common voltage generating units 121 respectively, the common voltage outputted by the first common line CM1 and the second common line CM2 is more stable, thereby reducing the influence of capacitive coupling on the common voltage.

The multiple second common lines CM2 extending in the second direction F2 are disposed on the second surface 10_c_2 of the array substrate 10_c_, and the multiple second common lines CM2 are electrically connected to the multiple first common lines CM1 via the multiple conductive portions E, so that the multiple second common lines CM2 can transfer the received common voltage Vcom to the multiple first common lines CM1 through the conductive portions E, as such, the influence of the coupling effect of the scan line G and the first common line CM1 on the common voltage is eliminated, thereby preventing the crosstalk phenomenon due to the change in the common voltage. Meanwhile, feedback lines CL corresponding to multiple second common lines CM2 are provided, so that the common voltage generating circuit 12 can correspondingly adjust the outputted common voltage according to the feedback signal transmitted through the feedback line CL, so that the common voltage keeps stable.

It should be understood that applications of the disclosure are not limited to the above examples, and those skilled in the art can make improvements or modifications according to the above descriptions, and all these improvements and modifications shall belong to the scope of protection of the appended claims of the disclosure.

What is claimed is:

1. An array substrate, comprising a first surface and a second surface opposite to the first surface, wherein the first surface is provided with a plurality of scan lines extending along a first direction, a plurality of data lines extending along a second direction, and a plurality of pixel units arranged in an array, the first direction is different from the second direction, and the pixel unit is configured to receive a scan signal from the scan line and receive a data signal from the data line, and configured to display an image according to the data signal under control of the scan signal, wherein the array substrate further comprises a plurality of first common lines and a plurality of second common lines, wherein the plurality of first common lines extend along the first direction and are arranged on the first surface at intervals of a first distance along the second direction, the plurality of second common lines extend along the second direction and are arranged on the second surface at intervals of a second distance along the first direction, the first common line and the second common line are electrically connected to each other penetrating through the first surface and the second surface of the array substrate; wherein for the plurality of second common lines on the second surface, projections thereof on the first surface coincide with the data lines, and the first common line and the second common line are configured to transmit a common voltage to the pixel unit to drive, together with the data signal, the pixel unit to display an image, and wherein the array substrate further comprises a plurality of conductive portions penetrating through the array substrate, the conductive portion is located at a position where the first common line intersects with the second common line, and the conductive portion is connected to at least one of first common line and at least one second common line;

for conductive portions in any adjacent i-th row and (i+1)-th row, a plurality of second common lines correspondingly connected to conductive portions in the i-th row and a plurality of second common lines correspondingly connected to conductive portions in the (i+1)-th row are alternately arranged along the first direction, wherein i is a positive integer; and for conductive portions in any adjacent j-th column and (j+1)-th column, a plurality of first common lines correspondingly connected to conductive portions in the j-th column and a plurality of first common lines correspondingly connected to conductive portions in the (j+1)-th column are alternately arranged along the second direction, wherein j is a positive integer.

2. The array substrate of claim 1, wherein in a plurality of conductive portions disposed in a same row along the first direction, any two adjacent conductive portions are correspondingly connected to two second common lines which are spaced apart by at least one second common line; and in a plurality of conductive portions arranged in a same column along the second direction, any two adjacent conductive portions are correspondingly connected to two first common lines which are spaced apart by at least one first common line.

3. The array substrate of claim 1, wherein the plurality of second common lines are configured to receive the common voltage from a common voltage generating circuit, and transmit the received common voltage to the plurality of first common lines through the plurality of conductive portions.

4. The array substrate of claim 3, wherein the plurality of first common lines are connected to one common voltage generating unit of the common voltage generating circuit, the plurality of second common lines are connected to another common voltage generating unit of the common voltage generating circuit, the first common line and the second common line are configured to receive the common voltage from the correspondingly connected common voltage generating unit.

5. The array substrate of claim 3, wherein the array substrate further comprises a plurality of feedback lines disposed on the second surface and extending in the second direction, any one of the feedback lines is correspondingly electrically connected to one of the second common lines and the common voltage generating circuit, the feedback lines are electrically connected to the plurality of conductive portions along the second direction, and the common voltage generating circuit is configured to output the common voltage to the second common line, receive a feedback signal from the feedback line, and adjust the output common voltage according to the feedback signal.

6. The array substrate of claim 5, wherein for the plurality of feedback lines located on the second surface, projections thereof on the first surface coincide with the data lines.

7. A display panel, comprising a data driving circuit, a common voltage generating circuit, and an array substrate, wherein the array substrate comprises a first surface and a second surface opposite to the first surface, wherein the first surface is provided with a plurality of scan lines extending along a first direction, a plurality of data lines extending along a second direction, and a plurality of pixel units arranged in an array, the first direction is different from the second direction, and the pixel unit is configured to receive a scan signal from the scan line and receive a data signal from the data line, and configured to display an image according to the data signal under control of the scan signal, wherein the array substrate further comprises a plurality of first common lines and a plurality of second common lines, wherein the plurality of first common lines extend along the first direction and are arranged on the first surface at intervals of a first distance along the second direction, the plurality of second common lines extend along the second direction and are arranged on the second surface at intervals of a second distance along the first direction, the first common line and the second common line are electrically connected to each other penetrating through the first surface and the second surface of the array substrate; wherein for the plurality of second common lines on the second surface, projections thereof on the first surface coincide with the data lines, and the first common line and the second common line are configured to transmit a common voltage to the pixel unit to drive, together with the data signal, the pixel unit to display an image, wherein the common voltage generating circuit is configured to output the common voltage to the pixel unit in the array substrate, the data driving circuit is configured to output the data signal to the pixel unit, and a scan driving circuit disposed on the array substrate is configured to output the scan signal to the pixel unit, the pixel unit is configured to receive the data signal under control of the scan signal, and the pixel unit is driven by a data voltage corresponding to the data signal and the common voltage to display an image, and wherein the array substrate further comprises a plurality of conductive portions penetrating through the array substrate, the conductive portion is located at a position where the first common line intersects with the second common line, and the conductive portion is connected to at least one of first common line and at least one second common line;

for conductive portions in any adjacent i-th row and (i+1)-th row, a plurality of second common lines correspondingly connected to conductive portions in the i-th row and a plurality of second common lines correspondingly connected to conductive portions in the (i+1)-th row are alternately arranged along the first direction, wherein i is a positive integer; and for conductive portions in any adjacent j-th column and (j+1)-th column, a plurality of first common lines correspondingly connected to conductive portions in the j-th column and a plurality of first common lines correspondingly connected to conductive portions in the (j+1)-th column are alternately arranged along the second direction, wherein j is a positive integer.

8. The display panel of claim 7, wherein in a plurality of conductive portions disposed in a same row along the first direction, any two adjacent conductive portions are correspondingly connected to two second common lines which are spaced apart by at least one second common line; and in a plurality of conductive portions arranged in a same column along the second direction, any two adjacent conductive portions are correspondingly connected to two first common lines which are spaced apart by at least one first common line.

9. The display panel of claim 7, wherein the plurality of second common lines are configured to receive the common voltage from a common voltage generating circuit, and transmit the received common voltage to the plurality of first common lines through the plurality of conductive portions.

10. The display panel of claim 9, wherein the plurality of first common lines are connected to one common voltage generating unit of the common voltage generating circuit, the plurality of second common lines are connected to another common voltage generating unit of the common voltage generating circuit, the first common line and the second common line are configured to receive the common voltage from the correspondingly connected common voltage generating unit.

11. The display panel of claim 9, wherein the array substrate further comprises a plurality of feedback lines disposed on the second surface and extending in the second direction, any one of the feedback lines is correspondingly electrically connected to one of the second common lines and the common voltage generating circuit, the feedback lines are electrically connected to the plurality of conductive portions along the second direction, and the common voltage generating circuit is configured to output the common voltage to the second common line, receive a feedback signal from the feedback line, and adjust the output common voltage according to the feedback signal.

12. The display panel of claim 11, wherein for the plurality of feedback lines located on the second surface, projections thereof on the first surface coincide with the data lines.

* * * * *